United States Patent
Sugahara

(10) Patent No.: US 8,384,529 B2
(45) Date of Patent: Feb. 26, 2013

(54) MOBILE APPARATUS INCLUDING TWO FORCE-SENSE GENERATING MECHANISMS

(75) Inventor: Hiroto Sugahara, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 676 days.

(21) Appl. No.: 12/606,452

(22) Filed: Oct. 27, 2009

(65) Prior Publication Data

US 2010/0101480 A1 Apr. 29, 2010

(30) Foreign Application Priority Data

Oct. 27, 2008 (JP) .................................. 2008-275251

(51) Int. Cl.
*H04B 3/36* (2006.01)

(52) U.S. Cl. .................... 340/407.1; 340/611; 340/691.7

(58) Field of Classification Search ............... 340/407.1, 340/407.2, 665, 666, 611–615, 619, 625, 340/680–683, 686.5, 691.7
See application file for complete search history.

(56) References Cited

U.S. PATENT DOCUMENTS

| | | | | |
|---|---|---|---|---|
| 4,608,508 A | * | 8/1986 | Ohnishi | 310/339 |
| 4,870,864 A | * | 10/1989 | Io | 73/514.12 |
| 5,012,663 A | * | 5/1991 | Brown | 72/369 |
| 5,427,348 A | * | 6/1995 | Bacon et al. | 248/555 |
| 5,503,030 A | * | 4/1996 | Bankestrom | 73/862.627 |
| 2007/0091063 A1 | | 4/2007 | Nakamura et al. | |
| 2008/0059131 A1 | | 3/2008 | Tokita et al. | |

FOREIGN PATENT DOCUMENTS

| | | |
|---|---|---|
| JP | 7112074 | 5/1995 |
| JP | 7314793 | 12/1995 |
| JP | 11004996 | 1/1999 |
| JP | 11338037 | 12/1999 |
| JP | 2000-033183 | 2/2000 |
| JP | 2002-346225 | 12/2002 |
| JP | 2005-190465 | 7/2005 |
| JP | 2006-65665 | 3/2006 |
| JP | 2007248478 | 9/2007 |
| JP | 2008-28774 | 2/2008 |
| JP | 2008-123061 | 5/2008 |

* cited by examiner

*Primary Examiner* — Daniel Previl
(74) *Attorney, Agent, or Firm* — Frommer Lawrence & Haug LLP

(57) ABSTRACT

A mobile apparatus includes a casing; a first force-sense generating mechanism which selectively imparts, to the user who is carrying the casing; a force-sense of a first translation force directed toward one side in a first direction, and a force-sense of a second translational force directed toward the other side in the first direction; and a second force-sense generating mechanism which is arranged in the casing, at an opposite side of the first force-sense generating mechanism with respect to a straight line passing through a center of gravity of the mobile apparatus, and which selectively imparts a force-sense of a third translational force directed toward one side in a second direction which is substantially parallel to the first direction, and a force-sense of a fourth translational force directed toward the other side in the second direction.

14 Claims, 14 Drawing Sheets

MOBILE APPARATUS INCLUDING TWO FORCE-SENSE GENERATING MECHANISMS

CROSS-REFERENCE TO RELATED APPLICATION

The present application claims priority from Japanese Patent Application No. 2008-275251, filed on Oct. 27, 2008, the disclosure of which is incorporated herein by reference in its entirety.

BACKGROUND OF THE INVENTION

1. Field of the Invention

The present invention relates to a mobile apparatus that a user can carry such as, for example, a portable inkjet printer, a mobile telephone, a handset of a landline telephone, a digital still camera, a digital video camera, a portable video game console, a portable audio player, a controller of a stationary type video game console, or a TV remote controller.

2. Description of the Related Art

Such mobile apparatus includes a display unit such as a liquid-crystal panel, and a speaker, and it is possible to present information to the user by appealing to ears and eyes of the user by the abovementioned devices. For example, information indicating a status of an apparatus such as a remaining battery level, and information for teaching an operation procedure or an operating method of an apparatus is presented to the user. Moreover, in recent years, presenting information to the user by appealing to a force-sense by using an apparatus which is operated to impart a pseudo force-sense (pseudo tactile-force) when a translational force is generated in a casing has been proposed (refer to Japanese Patent Application Laid-open Nos. 2008-28774 and 2006-65665).

SUMMARY OF THE INVENTION

However, generally, mechanical components and electronic components which are necessary for operating the apparatus are already compactly arranged inside a casing of a conventional mobile apparatus, and it is difficult to arrange a force-sense generating unit newly. Under such circumstances, expanding a volume of the casing, and arranging a force-sense generating apparatus to drive into corner-portion space developed by the expansion of the volume of the casing is taken into consideration.

In this case, when the user holds a corner portion in which the force-sense generating apparatus is arranged, a direction in which a translational force generated in the casing by an operation of the force-sense generating apparatus acts may coincide with a direction of the force-sense perceived by the user. Therefore, a force-sense of the translation force in a desired direction is exerted to the user. However, when the user holds a corner portion at an opposite side thereof, there is a possibility that a force-sense by which the casing may be tilted with users hand as a supporting point is imparted to the user. When such force-sense is imparted to the user, the force-sense in the desired direction ceases to be imparted to the user, and there is a possibility that information which is about to be presented by appealing to the force-sense is not transmitted to the user accurately (appropriately).

Therefore, an object of the present invention is to stabilize a direction in which the force-sense imparted to the user who holds the casing of the mobile apparatus acts, and accordingly, to transmit the information presented upon appealing to the force-sense to the user accurately.

The present invention is made in view of the abovementioned circumstances. According to an aspect of the present invention, there is provided a mobile apparatus which is carriable by a user, including:

a casing;

a first force-sense generating mechanism which is arranged in the casing, and which selectively imparts, to the user who is carrying the casing, a force-sense of a first translation force directed toward one side in a first direction, and a force-sense of a second translational force directed toward the other side in the first direction; and a second force-sense generating mechanism which is arranged in the casing, at an opposite side of the first force-sense generating mechanism with respect to a straight line passing through a center of gravity of the mobile apparatus, and which selectively imparts a force-sense of a third translational force directed toward one side in a second direction which is substantially parallel to the first direction, and a force-sense of a fourth translational force directed toward the other side in the second direction.

By making such a structure, by using the two force-sense generating mechanisms which generate the translational force at two locations which are mutually drawn apart (mutually separated), it is possible to impart a stable force-sense of a translational force which is not biased, to the user, irrespective of a location of holding in a case where the user is holding the casing.

As it has been described above, according to the mobile apparatus of the present invention, when the user is holding the casing, it is possible to stabilize a direction in which, the force-sense which is imparted to the user who is holding the casing acts, in a case where the user is holding the casing.

BRIEF DESCRIPTION OF THE DRAWINGS

FIG. 4A shows a state in which, a positive acceleration is generated in a weight of the force-sense generating unit, and FIG. 4B shows a state in which, a negative acceleration is generated in the weight of the force-sense generating unit;

FIG. 5A shows an operation pattern when a pseudo force-sense which makes feel that a translational force in an upward direction has been acting, is imparted to the user, and FIG. 5B shows an operation pattern when a pseudo force-sense which makes feel that a translational force in a downward direction has been acting, is imparted to the user;

FIG. 6A shows an operation pattern when a pseudo force-sense which makes feel that a rotational force in a clockwise direction has been acting, is imparted to the user; and FIG. 6B shows an operation pattern when a pseudo force-sense which makes feel that a rotational force in an anticlockwise direction has been acting, is imparted to the user;

DETAILED DESCRIPTION OF THE PREFERRED EMBODIMENTS

Figure 1:
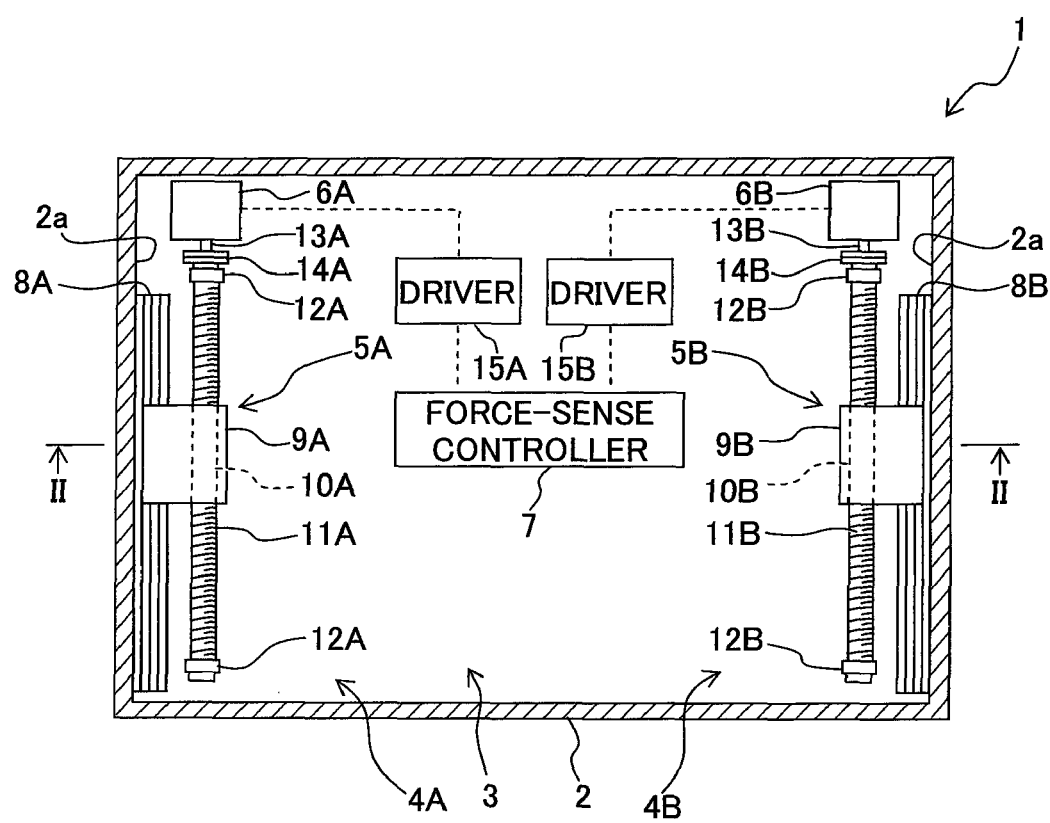
FIG. 1 is a cross-sectional view in which, important components of an internal structure of a mobile apparatus according to an embodiment of the present invention are shown schematically.
Figure 2:
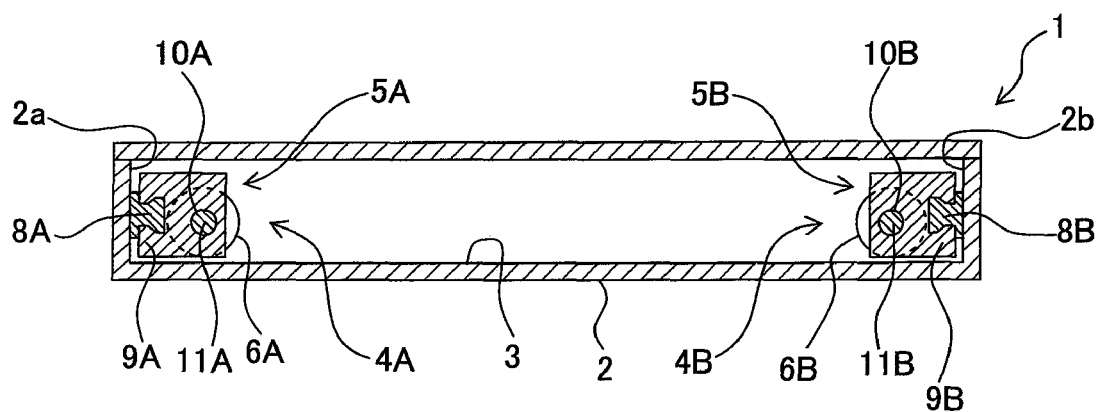
FIG. 2 is a schematic cross-sectional view of the mobile apparatus which is shown upon cutting along a line II-II in FIG. 1.

An embodiment according to the present invention will be described below with reference to the accompanying diagrams. A mobile apparatus 1 shown in FIGS. 1 and 2 is a portable electronic equipment, such as a mobile ink jet printer, a mobile telephone, a cordless handset of a land-line phone, a digital still camera, a digital video camera, a mobile game console, a mobile music player, a remote controller of a stationary game console, and a remote controller of a television. The mobile apparatus 1 includes a casing 2 which is formed of a size that is easy to carry for a user not shown in the diagram. Force-sense generating units 4A and 4B (a first force-sense generating mechanism and a second force-sense generating mechanism), which are operated such that a force-sense is imparted to the user who is holding the casing 2, are provided in an internal space 3 formed in the casing 2.

Firstly, a structure of the force-sense generating units 4A and 4B will be described below. As shown in FIGS. 1 and 2, the force-sense generating units 4A and 4B include translational motion mechanisms 5A and 5B, actuators 6A and 6B which drive the translational motion mechanisms 5A and 5B, and a force-sense controller 7 which controls an operation of the actuators 6A and 6B installed in the internal space 3 of the casing 2. The force-sense controller 7 will be indicated by blocks functionally.

In the embodiment, two force-sense generating units 4A and 4B are provided in the internal space 3 formed in the casing 2. The translational motion mechanisms 5A and 5B, and the actuators 6A and 6B are provided individually for each of the force-sense generating units 4A and 4B, and these two sets of the translational motion mechanisms 5A and 5B, and the actuators 6A and 6B are arranged in parallel mutually, at a distance. Whereas, the force-sense controller 7 is in singularity, and is provided in common to the two force-sense generating units 4A and 4B.

The translational motion mechanisms 5A and 5B are provided with guide rails 8A and 8B which are installed on two inner-side surfaces 2a and 2b which define the internal space 3 of the casing 2. The two inner-side surfaces 2a and 2b are mutually parallel, and the two guide rails 8A and 8B are arranged to be mutually parallel in a direction of extension thereof. Weights (Spindles) 9A and 9B are non-rotatably but slidably supported by the guide rails 8A and 8B respectively, and the weights 9A and 9B are reciprocatable inside the casing 2, along an extending direction of the guide rails 8A and 8B. Mail-screw holes 10A and 10B are cut through the weights 9A and 9B, and when the weights 9A and 9B are supported by the guide rails 8A and 8B respectively, axes of the male-screw holes 10A and 10B respectively are directed in the extending direction of the guide rails 8A and 8B. Ball screws 11A and 11B having threads of a male screw are screwed (inserted) through the male-screw holes 10A and 10B. The ball screws 11A and 11B are rotatably supported by bearings 12A and 12B installed inside the casing 2, and are incapable of translation (translational motion) in a rotation-axis direction.

The actuators 6A and 6B include an electric motor such as a servo motor and a linear motor. Output shafts 13A and 13B which are capable of rotating in a normal direction and a reverse direction are provided to the actuator 6A and 6B respectively, and the output shafts 13A and 13B are coupled with end portions of the ball screws 11A and 11B respectively, via joints 14A and 14B. When the actuators 6A and 6B are driven, the output shafts 13A and 13B rotate, and a rotational driving force from the output shafts 13A and 13B is input to the ball screws 11A and 11B, thereby driving the ball screws 11A and 11B to be rotated in a predetermined direction. When the ball screws 11A and 11B which are incapable of the translation rotate, the weights 9A and 9B which are incapable of rotating in a rotational direction and a helical direction of the ball screws 11A and 11B are subjected to translational motion toward one of the extending direction of the guide rails 8A and 8B.

The force-sense controller 7 is connected to the actuators 6A and 6B via the drivers 15A and 15B, and controls a direction of rotation, a rotational velocity (speed) and a rotational acceleration of the output shafts 13A and 13B of the actuators 6A and 6B by outputting a control command to the drivers 15A and 15B. Accordingly, the direction of rotation, the rotational velocity, and the rotational acceleration of the ball screws 11A and 11B of the translational motion mechanisms 5A and 5B are controlled, and furthermore, a position, a direction of movement, a velocity, and an acceleration of the weights 9A and 9B are controlled.

Next, a basic operation of the force-sense generating unit 4 (force-sense generating units 4A and 4B) will be described below. For the convenience of explanation, a direction in which the weight 9 (weights 9A and 9B) reciprocates is let to be a 'vertical direction' according to the diagram. The velocity when the weight 9 moves upward is let to be positive (a positive velocity), and a velocity when the weight 9 moves downward is let to be negative. Regarding the sign of the acceleration generated in the weight 9 and the sign of the force which acts based on the acceleration are also defined by the abovementioned relationship.

Figure 3:
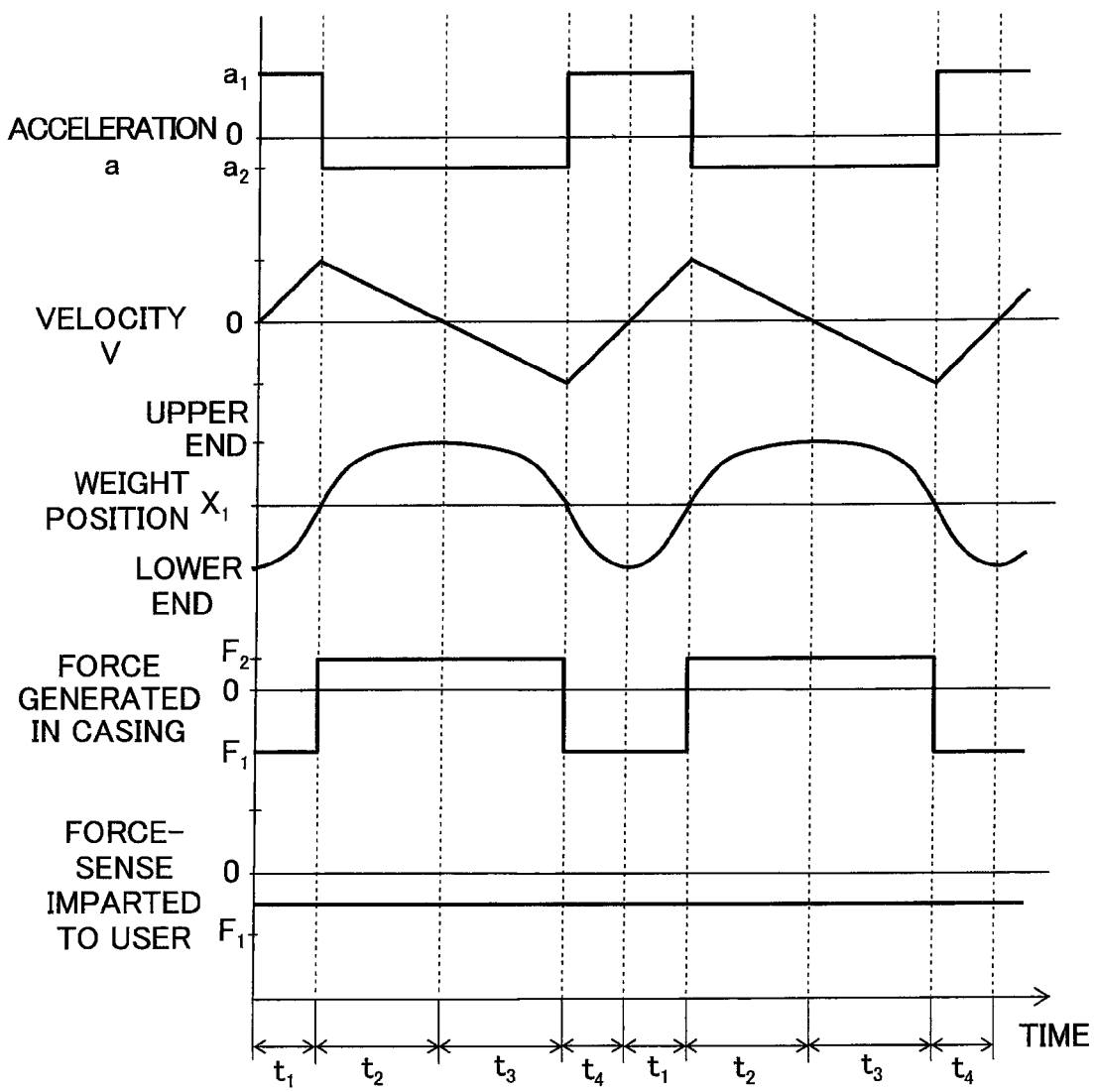
FIG. 3 is a timing chart explaining a basic operation of a force-sense generating unit shown in FIG. 1.

FIG. 3 is a timing chart explaining the basic operation of the force-sense generating unit 4 shown in FIG. 1. In an initial state, it is assumed that the weight 9 is positioned at a lower end of a range of movement, and a velocity V of the weight 9 is 0. As shown in FIG. 3, when the weight 9 undergoes translational motion in an upward direction from the initial state, positive accelerational is generated in the weight 9, and the velocity V of the weight accelerates to a positive side. When a predetermined time $t_1$ is elapsed after the weight 9 starts moving, the weight 9 reaches a predetermined position x1 (a central position of the range of movement in an example shown in FIG. 3), and thereafter, a negative acceleration a2 is generated in the weight 9, and the velocity of the weight 9 goes on decreasing. When a predetermined time $t_2$ has elapsed after the acceleration "a" has changed to negative, the velocity of the weight 9 becomes 0, and the weight 9 reaches an upper end of the range of movement. Next, the negative acceleration a2 is generated in the weight 9 and the weight 9 moves downward while accelerating the velocity V to a negative side. When a predetermined time $t_3$ is elapsed after the direction of movement of the weight 9 has changed to be downward, the weight 9 reaches the abovementioned predetermined position x1, and thereafter, the positive accelerational is generated in the weight 9, and the velocity V of the weight 9 goes on decreasing. When a predetermined time $t_4$ is elapsed after the acceleration a has changed to positive, the velocity V of the weight 9 becomes 0, and the weight 9 returns to the lower end in the range of movement. The force-sense generating unit 4 is structured such that this series of reciprocating movements of the weight 9 continues.

Figure 4A:
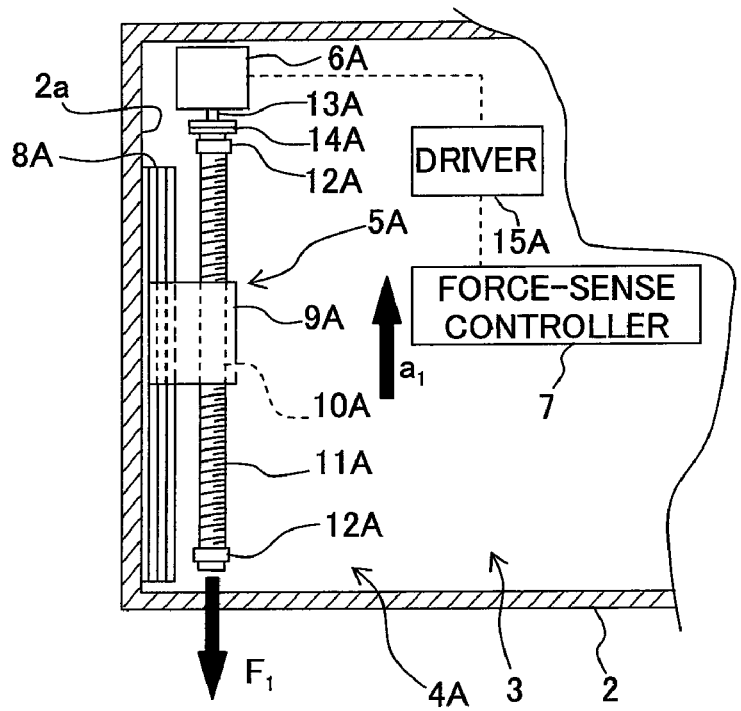
FIG. 4A and FIG. 4B are diagrams explaining the basic operation of the force-sense generating unit shown in FIG. 1, where.
Figure 4B:
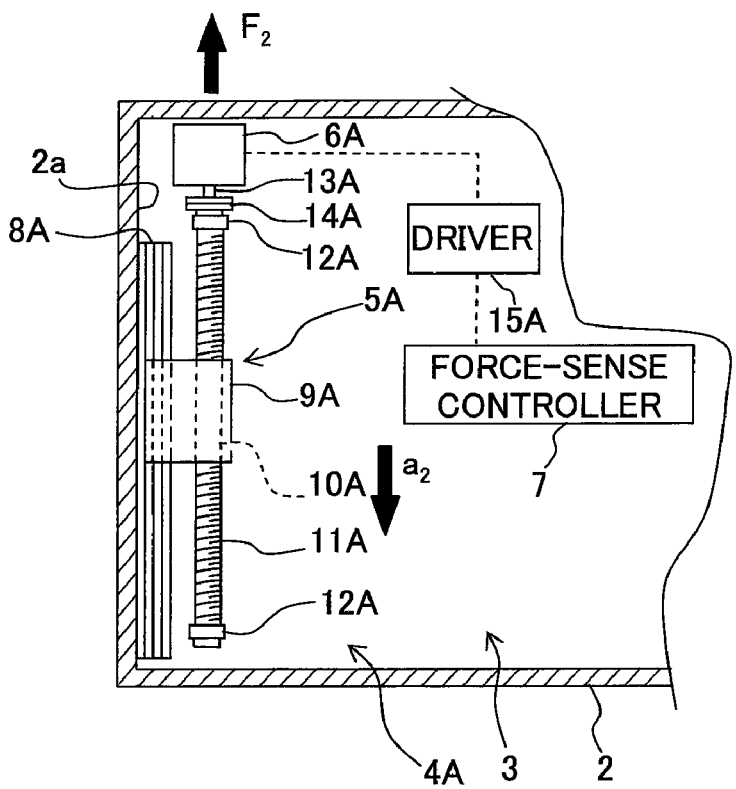

As shown in FIG. 4A, when the positive accelerational is generated in the weight 9, a negative force $F_1$ (directed downward) is generated in the casing 2 due to a counteraction, and a translational force in a downward direction corresponding to the force $F_1$ is exerted by the casing 2, onto a hand (palm) of the user who is holding the casing 2. As shown in FIG. 4B, when the negative acceleration a2 is generated in the weight 9, a positive force $F_2$ (directed upward) is generated in the casing 2, and a translational force in an upward direction corresponding to the force $F_2$ is exerted by the casing 2, onto a hand (palm) of the user who is holding the casing 2. When a mass of the weight 9 is let to be M, it is possible to obtain the forces $F_1$ and $F_2$ shown in FIGS. 4A and 4B by expressions $F_1=M\cdot(-a_1)$, and $F_2=M\cdot(-a_2)$.

As shown in FIG. 3, an absolute value of the positive accelerational is higher than an absolute value of the negative acceleration a2, and an absolute value of the negative force $F_1$ is higher than an absolute value of the positive force $F_2$ ($|a_1|>|a_2|$ and $|F_1|>|F_2|$). The force-sense controller 7 is structured to control the rotational velocity and the rotational acceleration of the output shaft 13 such that such movement of the weight 9 is realized. Accordingly, two asymmetrical forces of different magnitudes continuously act alternately on the user.

Here, a human being has a sensory property of being insensitive to a moderate force. A point that the sensory property of a human being has a nonlinearity is a known phenomenon (refer to Japanese Patent Application Laid-open Nos. 2008-28774 and 2006-65665). Therefore a description in detail of this point is omitted in this patent application.

As a result, the user in such situation, derived from user's own sensory property, has an illusion (a false feeling) that only a translational force in a downward direction which is a strong force as shown in a chart at the lowest stage in FIG. 3, has been acting. In other words, the force-sense generating unit 4, by driving the actuator 6 (the actuators 6A and 6B) such that at the time of making the weight 9 reciprocate continuously, the absolute value of the positive acceleration generated in the weight 9 differs from the absolute value of the negative acceleration, is capable of imparting to the user holding the casing 2, a pseudo force-sense which makes the user feel that a translational force in one side of the direction in which the weight 9 moves has been acting from is exerted by the casing 2.

Typically, the mass of the weight 9 is about 20 g, and a length of a stroke and a magnitude of an acceleration of the reciprocating movement of the weight is in a range of about 5 cm to 10 cm, and 1 G to 5 G, respectively. Moreover, it is preferable that a frequency of the reciprocating movement of the weight 9 is in a range of few Hz to few tens of Hz, and particularly, is about 10 Hz. The mass, the stroke, the acceleration, and the frequency of the reciprocating movement of the weight 9 are not restricted to the figure in the abovementioned example, and may be set according to a size of the casing and a magnitude of the translational force which is to be generated. Moreover, the mass of the two weights 9 may vary, but is desirable to be the same. When the mass of the two weights 9 differs mutually, it is possible to make the magnitude of the translational force generated due to the reciprocating movement of the two weights 9 to be the same by setting appropriately the parameters such as the acceleration and the frequency of the reciprocating movement of the weight 9. However, when the mass of both the weights 9 is same, a complicated control is not necessary for making the magnitude of the translational force same, and the parameters (such as the acceleration and the frequency) of the reciprocating movement of the two weights may be set to be the same.

An operation pattern of the weight 9 shown in FIG. 3 is only an example, and various modifications which fall within a range in which the pseudo force-sense is imparted, are possible. For example, when the absolute value of the negative acceleration is let to be higher than the absolute value of the positive acceleration, the direction of the translational force which is sensed virtually (pseudolly) by the user becomes opposite. Moreover, for simplifying the explanation, a pattern in which the velocity V changes linearly has been shown. However, an arrangement may be made such that the velocity V changes nonlinearly, and the absolute value of the positive acceleration and/or the absolute value of the negative acceleration change/changes as the time elapses. At this time, the weight 9 is to be reciprocated such that the maximum value of the absolute value of the positive acceleration generated in the weight 9 and the maximum value of the absolute value of the negative acceleration generated in the weight 9 differ. The position x1 of the weight 9 at which the acceleration "a" changes from positive to negative and vice versa is not restricted to a central position in the range of movement, and can be modified appropriately, and the time $(t_1+t_2+t_3+t_4)$ which is necessary for the reciprocating movement of the weight 9, can be set appropriately.

Moreover, it is also possible to change appropriately the structure (configuration) of the force-sense generating unit 4 shown in FIGS. 1 and 2. A structure in which the ball screw 11 (ball screws 11A and 11B) rotates in synchronization with the output shaft 13 has been shown as an example. However, a power transmission mechanism which converts the rotational velocity, or which converts the direction of rotation, or which converts the rotation-axis direction (the direction of axis of rotation) may be interposed between the output shaft 13 and the ball screw 11. Moreover, the translational motion mechanism 5 has a structure such that the rotational driving force generated by the actuator 6 is converted to the translational movement of the weight 9 by using a screw mechanism. However, any structure may be used provided that it is possible to make the weight 9 reciprocate by making the positive acceleration and the negative acceleration differ. For example, the translational motion mechanism 5 may have a linear motor, or, may have a pulley and a belt coupled with a motor.

As it has been described above, in the embodiment, one mobile apparatus 1 is provided with two force-sense generating units 4A and 4B. The two force-sense generating units 4A and 4B include the weights 9A and 9B respectively, which are reciprocatable in a mutually parallel direction, and the operation (the movement) of the two weights 9A and 9B is controlled independently. Consequently, at the time of operating the two weights 9A and 9B, broadly speaking, the weights 9A and 9B are to be moved by one of the four operation patterns (movement patterns) shown in FIGS. 5A, 5B, 6A and 6B.

Figure 5A:
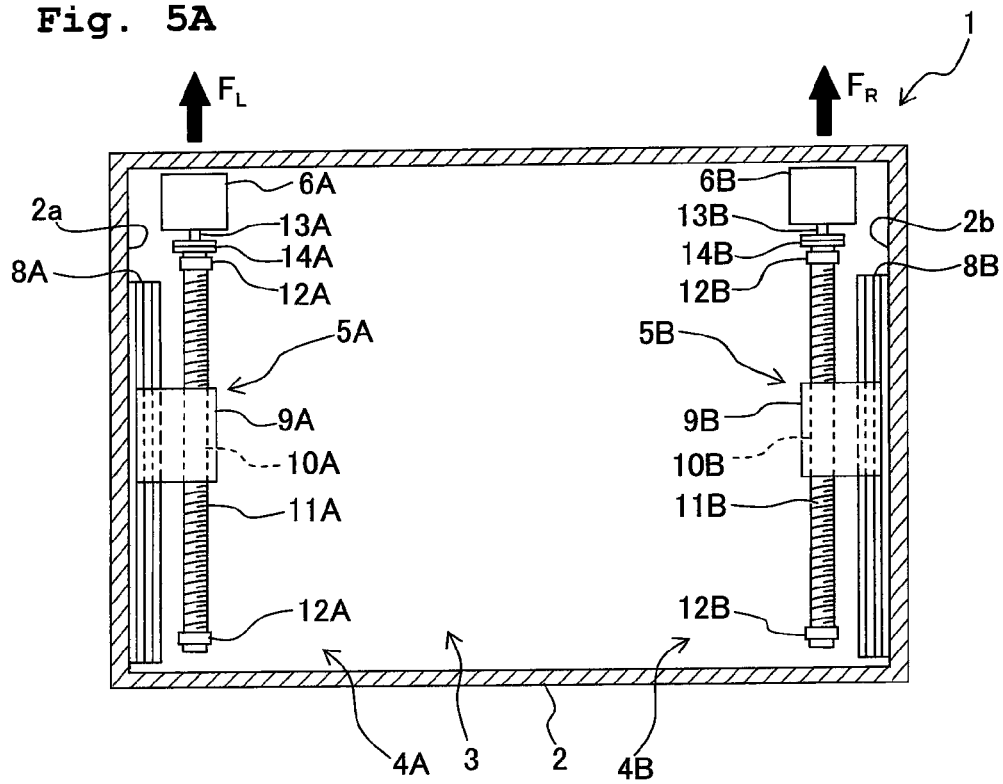
FIG. 5A and FIG. 5B are diagrams explaining an operation pattern of two force-sense generating apparatuses which carry out the basic operation explained in FIG. 3, where.
Figure 5B:
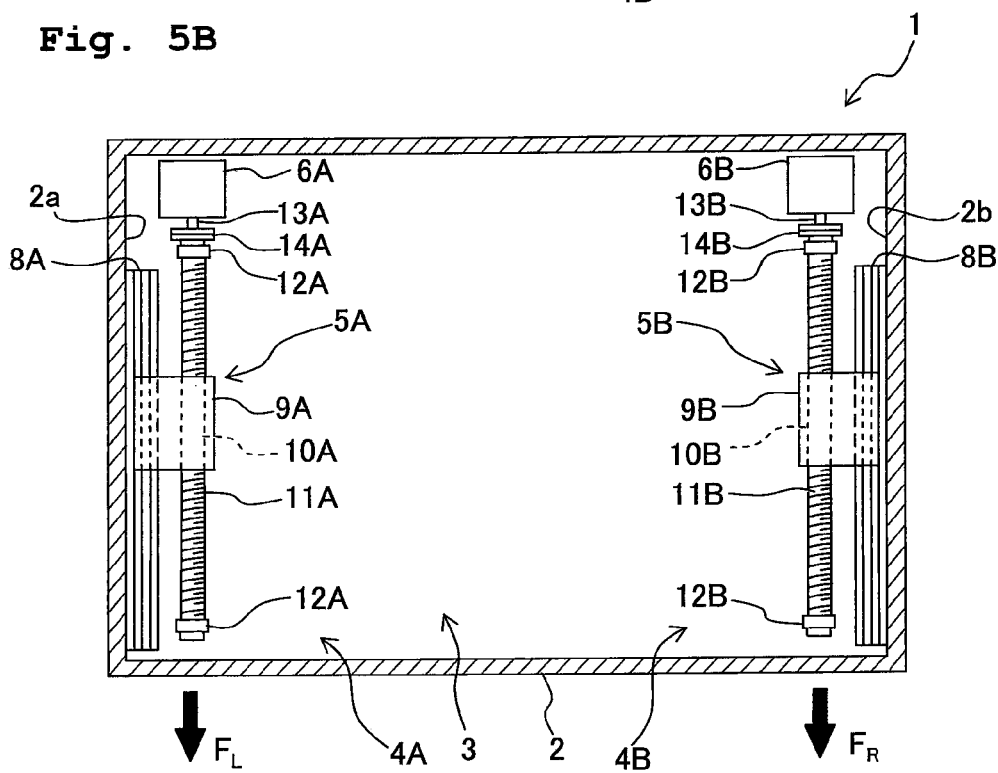

FIG. 5A shows an operation pattern in which, for both the weights 9A and 9B at left and right, the absolute value of the positive acceleration generated in the weights 9A and 9B is higher than the absolute value of the negative acceleration generated in the weights 9A and 9B. In this case, a pseudo force-sense which makes feel that a translational forces $F_L$ and $F_R$ in a downward direction based on the positive acceleration is imparted to the user from both left and right sides of the casing 2, and as a result, a pseudo force-sense which gives a feeling of being pulled downward is imparted to the user by the casing 2. FIG. 5B shows an operation pattern in a case opposite to the case shown in FIG. 5A. In this case, the pseudo force-sense which gives a feeling of being pulled upward is imparted to the user by the casing 2.

Figure 6A:
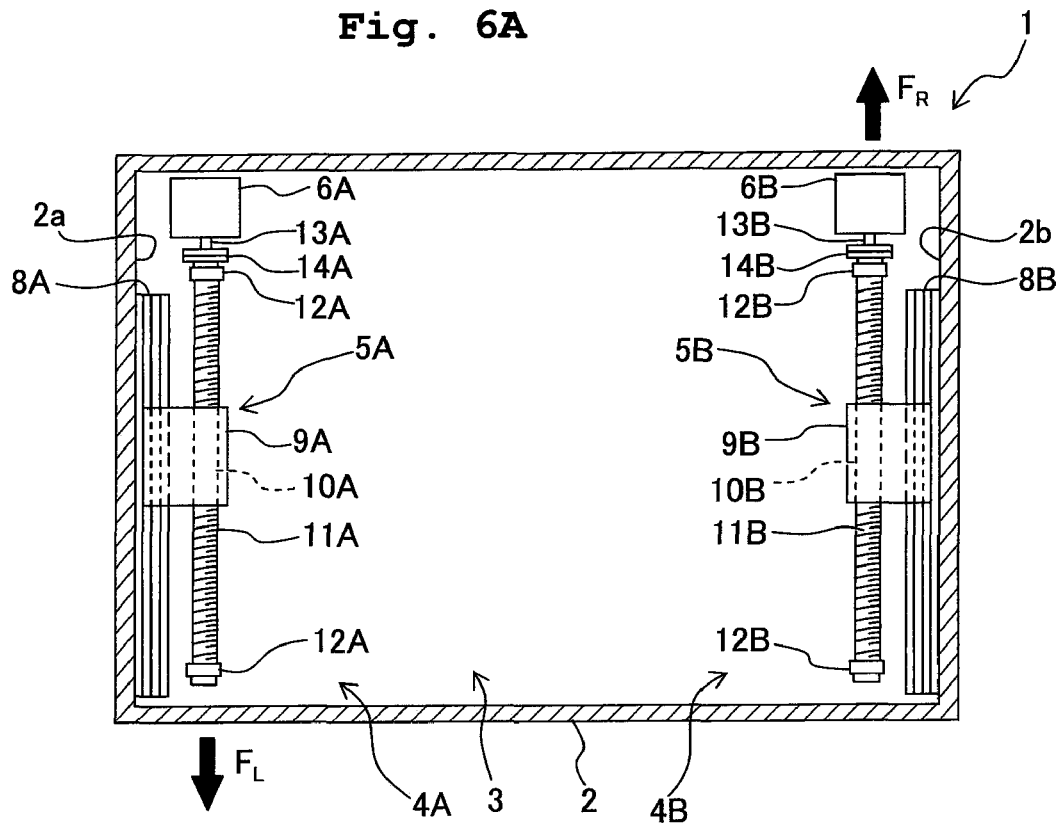
FIG. 6A and FIG. 6B are diagrams explaining an operation pattern of the two force-sense generating mechanisms which carry out the basic operation explained in FIG. 3, where.
Figure 6B:
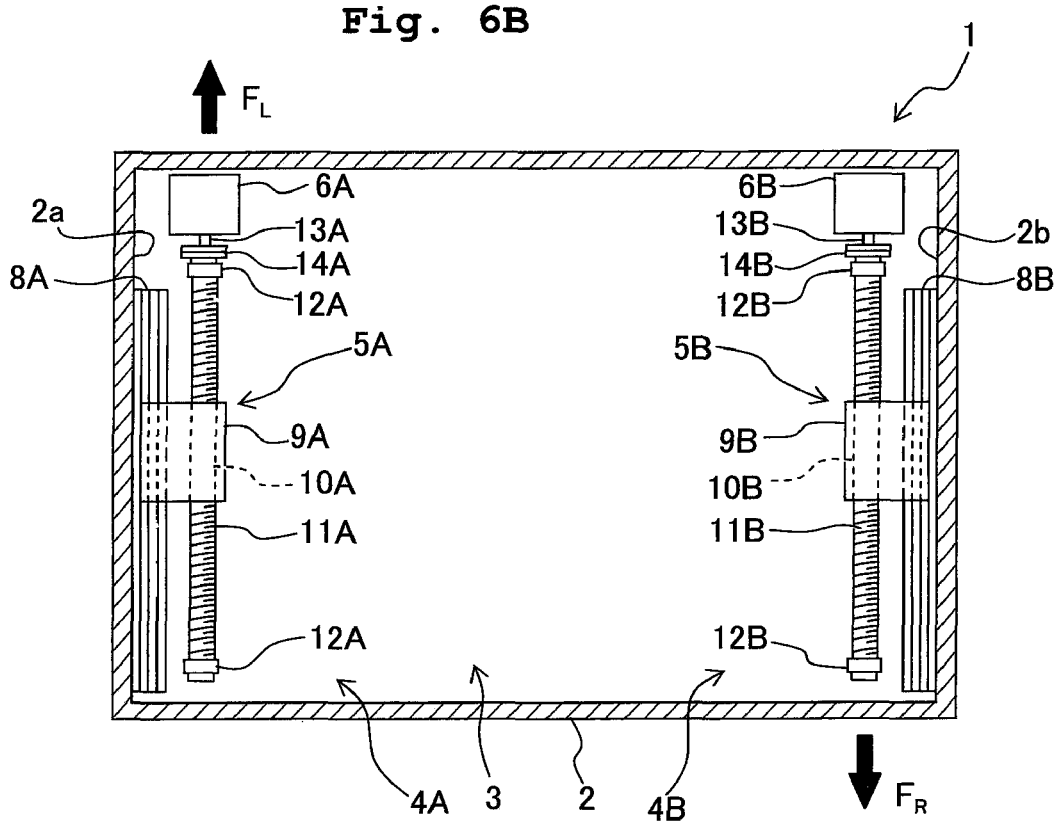

FIG. 6A shows an operation pattern in which, for the weight 9A at the left side, the absolute value of the positive acceleration is higher than the absolute value of the negative acceleration, and for the weight 9B at the right side, the absolute value of the negative acceleration is higher than the absolute value of the positive acceleration. In this case, a pseudo force-sense which makes feel that a translational force $F_L$ in a downward direction based on the positive acceleration has been acting from a left side of the casing 2, and a translational force $F_R$ in an upward direction based on the negative acceleration has been acting from the right side of the casing 2 is imparted to the user. As a result, a pseudo force-sense which makes feel as if a force of rotation in a counterclockwise direction has been acting from the casing 2, is imparted to the user. FIG. 6B shows an operation pattern in a case opposite to the case in FIG. 6A. In this case, the pseudo force-sense which makes feel as if the force of rotation in a clockwise direction has been acting from the casing 2, is imparted to the user.

In such manner, the force-sense of one of the four types of pseudo force-senses according to the operation pattern (movement pattern) of the weights 9A and 9B may be imparted to the user. The positive acceleration generated in the weights 9A is different from the negative acceleration generated in the weight 9A. Similarly, the positive acceleration generated in the weights 9B is different from the negative acceleration generated in the weight 9B. In the operation patterns shown in FIGS. 5A and 5B, the direction of the larger acceleration generated in the weight 9A is the same as that of the larger acceleration generated in the weight 9B. In this case, the pseudo force-sense which makes the user feel that a translational force toward one of the directions in which the weights reciprocate has been acting, is imparted to the user. Whereas, in the operation pattern shown in FIGS. 6A and 6B, the direction of the larger acceleration generated in the weight 9A is opposite to that of the larger acceleration generated in the weight 9B. In this case, the pseudo force-sense which makes the user feel as if a rotational force in a plane regulated by two straight lines which are trajectories of movement of the weights 9A and 9B has been acting, is imparted to the user.

When the acceleration of the weights 9A and 9B of two force-sense generating units 4A and 4B provided inside the casing 2 is controlled independently in such manner, it is possible to impart various types of force-senses to the user, at a low cost. Besides, the two force-sense generating units 4A and 4B are installed on the inner-side surfaces 2a and 2b respectively which define the internal space 3 of the casing 2, and the weights 9A and 9B reciprocate at positions close to the inner-side surfaces 2a and 2b. Therefore, the pair of weights 9A and 9B reciprocates at positions separated by a distance mutually, and a translational force is generated at both sides of the casing 2 by the reciprocating movement of the weights 9A and 9B. Consequently, the direction in which the pseudo force-sense which is imparted based on the translational force generated by the casing is stabilized irrespective of the locations at which the user holds the casing 2. Therefore, in presenting information to the user by appealing to the force-sense, it is possible to transmit that information to the user accurately by using the two force-sense generating units 4A and 4B.

A concrete structure for presenting the information to the user by appealing to the force-sense by the operation of the two force-sense generating units 4A and 4B will be described below by citing a plurality of examples. However, the information which can be presented by appealing to the force-sense by using the two force-sense generating units 4A and 4B is not restricted to the following examples.

Firstly, as a first example, a mobile ink jet printer is used as a mobile apparatus according to the present invention, and a control, in which an operating method for correcting a posture of the ink-jet printer (hereinafter, called as a 'posture-correction control') is presented to the user by appealing to the force-sense by the two force-sense generating units, will be described below.

Figure 7:
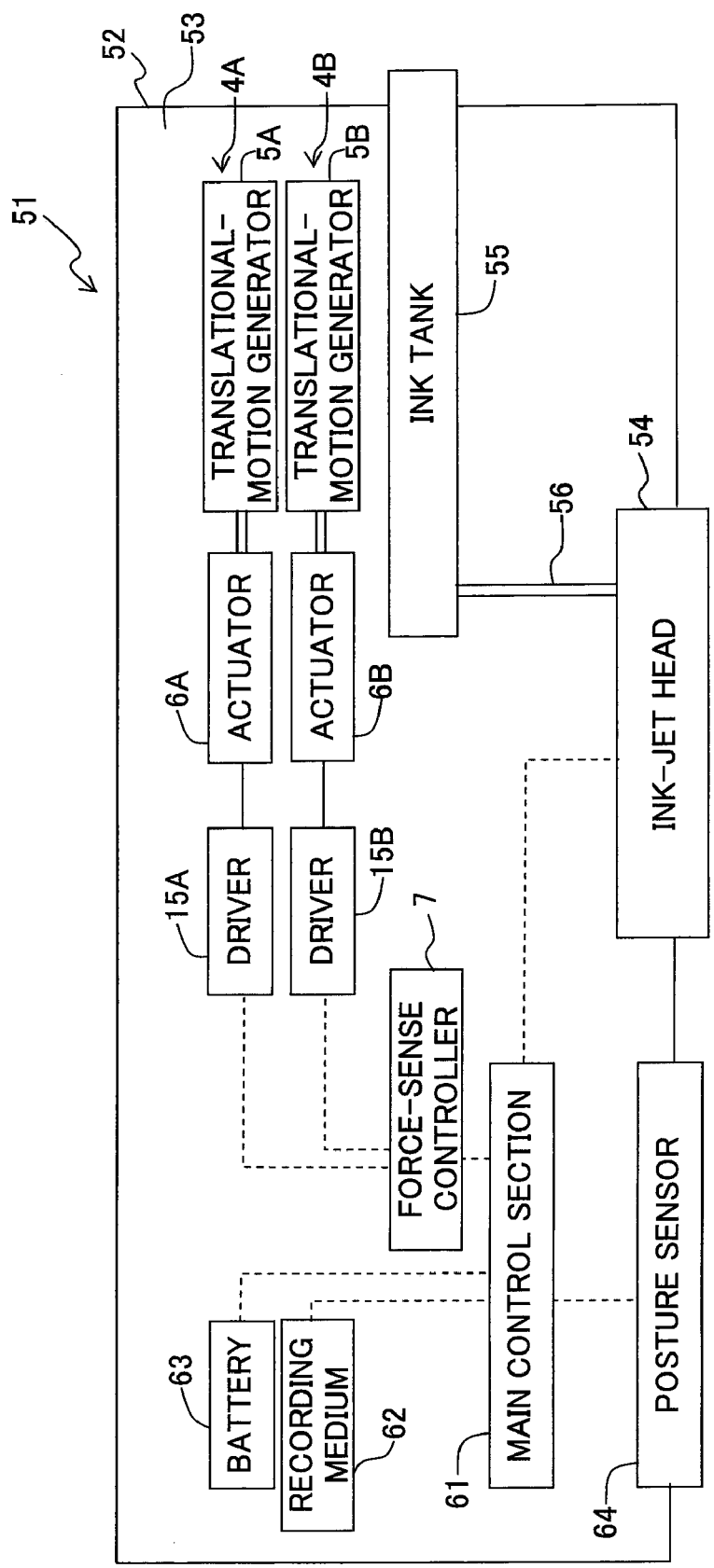
FIG. 7 is a block diagram showing functionally a structure of a mobile ink-jet printer as an example of an embodiment of the mobile apparatus according to the present invention.

As shown in FIG. 7, a mobile ink jet printer 51 includes a casing 52 having a substantially rectangular parallelepiped shape. An ink jet head 54 which is configured to jet ink droplets, and an ink tank 55 which stores an ink to be supplied to the ink-jet head 54 are installed in an internal space 53 of the casing 52. The ink tank 55 is structured in a cartridge form, and is detachable and replaceable. The ink tank 55 is connected to the ink jet head 54 via an ink supply channel 56 such as a tube.

Moreover, a main control section 61 which controls an overall operation of the mobile ink-jet printer 51 is provided in the internal space 53 of the casing 52. The main control section 61 is connectable to a recording medium 62 which is detachably mounted from outside of the mobile ink-jet printer 51, and controls a driving of the ink jet head 54 based on image information stored in the recording medium 62. Moreover, the main control section 61 is driven based on an electric power supplied from a battery 63.

The main control section 61 is connected to the force-sense controller 7 of the force-sense generating units 4A and 4B which are structured similarly as shown in FIGS. 1 and 2. The force-sense controller 7 controls the actuators 6A and 6B such that the weights 9A and 9B of the translational motion mechanisms 5A and 5B reciprocate and that a force-sense of the translational force in a direction based on a command from the main control section 61 is imparted to the user.

Moreover, a posture sensor 64 which detects a posture of the casing 52 is provided to the main control section 61. The posture sensor 64 includes a reflective type photointerrupter.

FIG. 8 is a diagram explaining the posture-correction control carried out by the main control section 61 shown in FIG. 7. FIG. 8 also shows an exterior appearance of the mobile ink-jet printer 51. Therefore, features of the exterior appearance of the mobile ink-jet printer 51 will be described below with reference to FIG. 8. As shown in FIG. 7, the posture sensors 64 are installed, on a lower surface of the casing 52, one by one at both ends of the casing 52, and detect an angle of inclination of the lower surface of the casing 52 with respect to a reflecting surface of a laser, by receiving a reflected light of the laser emerged from the posture sensors 64.

Moreover, the ink-jet head 54 is mounted on the casing 52 to expose from the lower surface of the casing 52, a nozzle opening surface 54a in which nozzles for jetting ink droplets (not shown in the diagram) are formed. The user holds the casing of the mobile ink jet printer 51 in a hand H, and arranges the nozzle opening surface 54a to face a recording medium M such as a paper which is located outside of the casing 52, and scans the casing 52 with respect to the recording medium M, thereby making land the ink jetted from the ink jet head 54 at appropriate location on the recording medium M. Accordingly, it is possible to form an image, on the recording medium M, based on image information.

Since the ink jet head 54 jets an ink from the nozzle opening surface 54a in a normal direction thereof, it is preferable that the nozzle opening surface 54a and the recording medium M faces in parallel in order for forming an image accurately by making the ink land appropriately on the recording medium M. On the other hand, a memory which is not shown in the diagram is built-in in the main control section 61 (refer to FIG. 6), and an angle of posture, which is an angle of inclination with respect to the reflecting surface of the laser light located at the lower surface of the casing 52 when the nozzle opening surface 54a and the recording medium M are parallel, is stored in the memory in advance as an optimum target posture for forming an image.

Figure 8A:
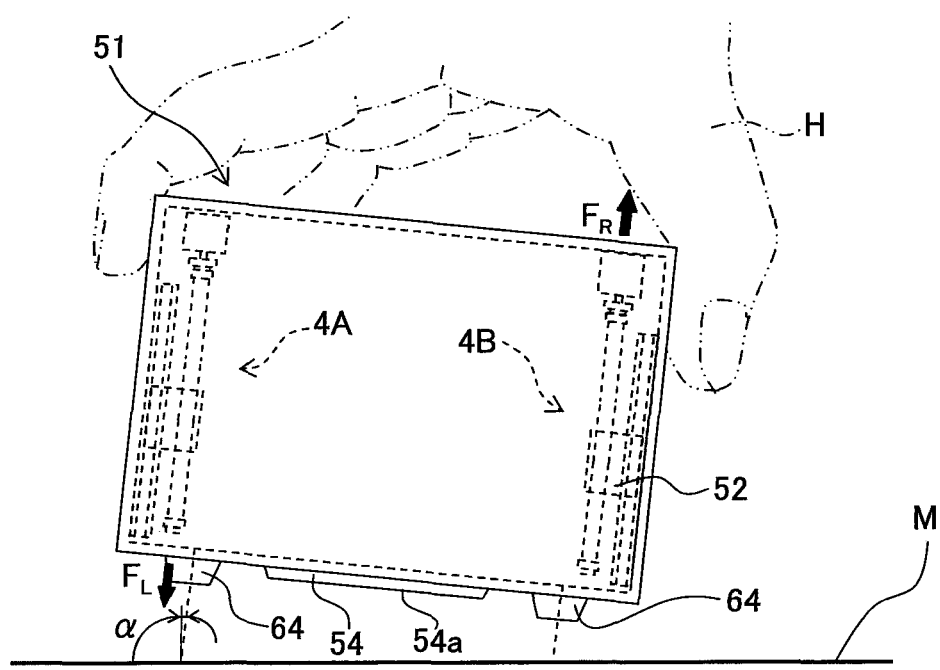
FIG. 8A and FIG. 8B are conceptual diagrams of a posture-correction control which the mobile ink-jet printer shown in FIG. 7 carries out.
Figure 8B:
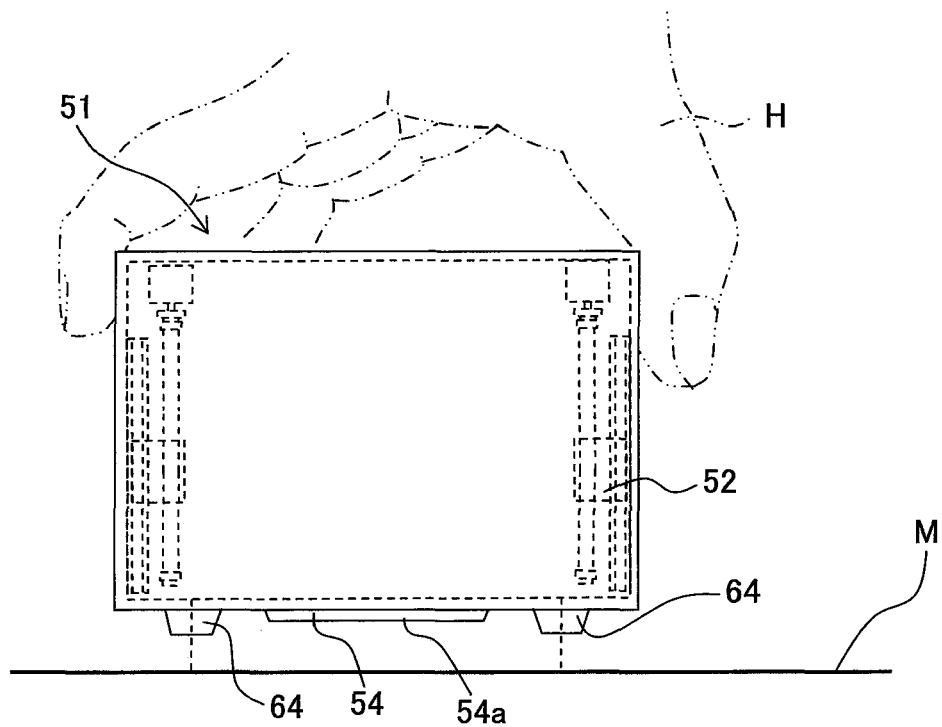

Next, the posture-correction control which is carried out by the main control section 61 of the mobile ink-jet printer 51 will be described below with reference to FIGS. 8A and 8B. As shown in FIG. 8A, the user, at the time of forming an image on the recording medium M, holds the casing 52 in the hand H such that the nozzle opening surface 54a faces the recording medium M. When forming an image is assumed in such manner, the main control section 51 compares a current posture of the casing 52 (hereinafter, called simply as a 'real posture of the casing 52') and a target posture stored in the memory which is not shown in the diagram, based on the information of angle of inclination, which is input from the posture sensor 64, and finds a direction of rotation which is necessary for making the real posture of the casing 52 to be the target posture. However, when FIG. 7A is referred to, even when the casing is rotated by θ [deg] in the counterclockwise direction, or even when the casing 52 is rotated by (360−θ) [deg], the real posture of the casing 52 becomes the target posture. Therefore, the main control section 61, for finding the direction of rotation which is necessary for making the real posture to be the target posture, selects a direction such that, the angle of rotation necessary for making the real posture to be the target posture becomes less than 180 [deg]. In other words, in a situation shown as an example in FIG. 8A, the counterclockwise direction is selected as this direction of rotation.

Moreover, the main control section 61 drives the two force-sense generating units 4A and 4B such that a pseudo force-sense which makes feel that a rotational force in this direction has been acting, is imparted to the user. In a situation shown as an example in FIG. 7A, the two force-sense generating units 4A and 4B are driven to have the operation pattern shown in FIG. 6B. The force-sense generating unit 4A at the left side is driven such that a pseudo force-sense which makes feel that the translational force $F_L$ in the downward direction has been acting, is imparted to the user, and the force-sense generating unit 4B at the right side is driven such that a pseudo force-sense which makes feel that the translational force $F_R$ in the upward direction has been acting, is imparted to the user.

Accordingly, the user virtually (pseudolly) feels that the rotational force in the counterclockwise direction is generated in the casing 52. When the user rotates the casing 52 following this force-sense, as shown in FIG. 8B, the nozzle opening surface 54a becomes parallel to the recording medium M, and it is possible to form an image accurately on the recording medium M.

In this manner, according to the first example, in the mobile ink jet printer 51 which is structured to form an image on the recording medium M while scanning the casing 52 by the user, an operation technique of as to how the casing 52 is to be rotated for having an optimum posture for forming an image by operating the two force-sense generating units 4A and 4B is presented to the user by appealing to the force-sense. It is possible to correct the posture only by rotating the casing 52 following the force-sense imparted to the user, and the user is capable of operating the mobile ink jet printer 51 intuitively. It is not possible to correct the posture only by making a mere parallel movement. Since it is possible to impart virtually (pseudolly) the rotational force to the user, the posture-correction control can be realized favorably by a mobile apparatus which is provided with two force-sense generating units.

Next, as a second example, a digital still camera which is structured to be capable of taking pictures is used as a mobile apparatus according to the present invention, and the posture-correction control of the digital still camera, which is carried out by making operate two force-sense generating units, will be described below.

Figure 9:
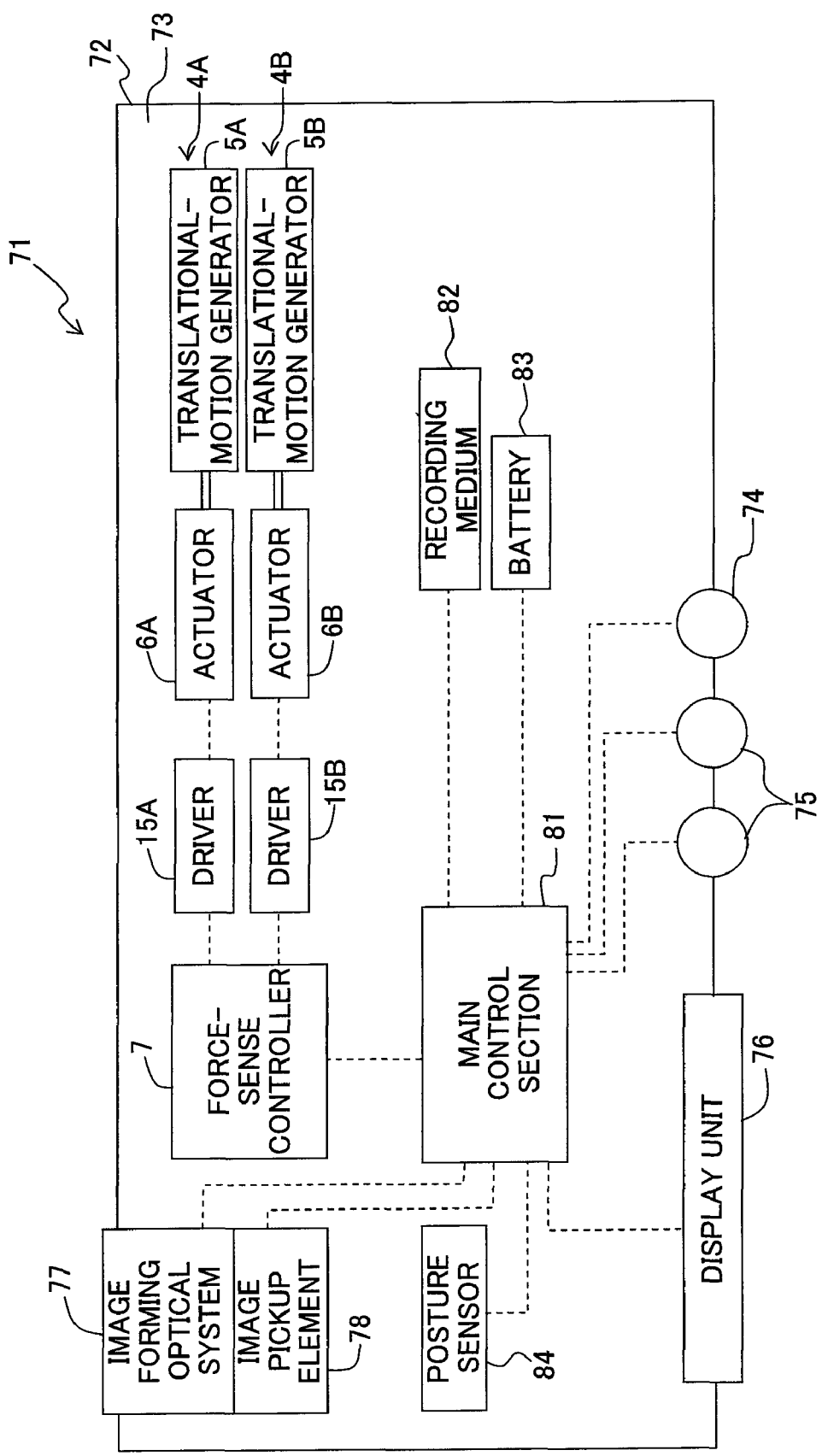
FIG. 9 is a block diagram showing schematically a structure of a digital still camera shown as an example of the embodiment of the mobile apparatus according to the present invention.

FIG. 9 is a block diagram, showing schematically a structure of a digital still camera shown as an example of the embodiment of the mobile apparatus according to the present invention. As shown in FIG. 9, a digital still camera 71 includes a casing 72 having a substantially rectangular parallelepiped shape. A shutter button 74 is provided on an upper surface of the casing 72, and a plurality of operating buttons 75 and a display unit 76 are provided on a rear surface of the casing 72.

As shown in FIG. 9, the digital camera 71 includes an image forming optical system for forming an image of light reflected from an object, and an image of the object is formed on an image pickup element (an imaging element) 78 made of a photoelectric transducer such as a CCD (charge coupled device). A lens barrel (not shown in the diagram) in which some of optical components forming the image forming optical system 77 are built-in, is provided on a front-surface side of the casing 72, and the image pickup element 78 is arranged in an internal space 73 of the casing 72.

Moreover, a main control section 81 which controls an overall operation of the digital still camera 71 is provided in the internal space 73 of the casing 72. The main control section 81 is capable of imparting commands to the image forming optical system 77 to make changes in a setting of parameters of the image forming optical system 77, such as an exposure time and a magnification, according to pressing of operating buttons 75 by the user. A slot which is not shown in the diagram is provided on a lower surface of the casing, and a recording medium 82 for storing image information, and a battery 83 which is a power source of the main control section 81 etc. are installed in the slot.

The main control section 81 processes an image signal which is input from the image pickup element 78, and output the processed image signal to the display unit 76 to display image information which is processed in real time. Therefore, the display unit 76 can function as a finder. When the user frames an object in the display unit 76 and presses the shutter button 74, the main control section 81 processes the image signal which has been input from the image pickup element 78 based on this operation, and stores the processed image information in the recording medium 82. By this series of operations, a picture is taken by the digital camera 71.

The main control section 81 is connected to the force-sense controller 7 of the force-sense generating units 4A and 4B structured similarly as shown in FIGS. 1 and 2. The force-sense controller 7 controls the actuators 6A and 6B such that the weights 9A and 9B of the translational motion mechanisms 5A and 5B reciprocate and that a force-sense of a translational force in a direction based on the command from the main control section 81 is imparted to the user.

Moreover, a posture sensor 84 which detects a posture of the casing 72 is provided to the main control section 81. The posture sensor 84 includes an inclination-angle sensor (an angle of inclination sensor) which detects an angle of inclination of the casing 72 with respect to a horizontal direction. On the other hand, a memory which is not shown in the diagram is built-in in the main control section 81, and an angle of inclination (posture) when the casing 72 is horizontal is stored in the memory in advance as an optimum target posture for taking a picture.

Figure 10A:
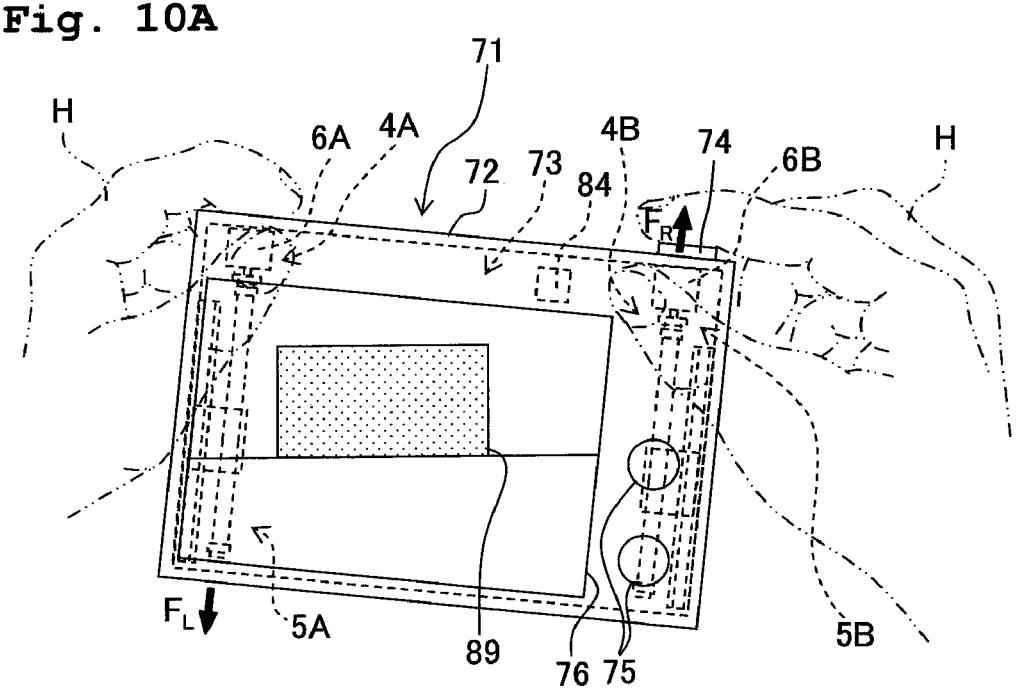
FIGS. 10A and 10B are conceptual diagrams of a posture-correction control which the digital still camera shown in FIG. 9 carries out.
Figure 10B:
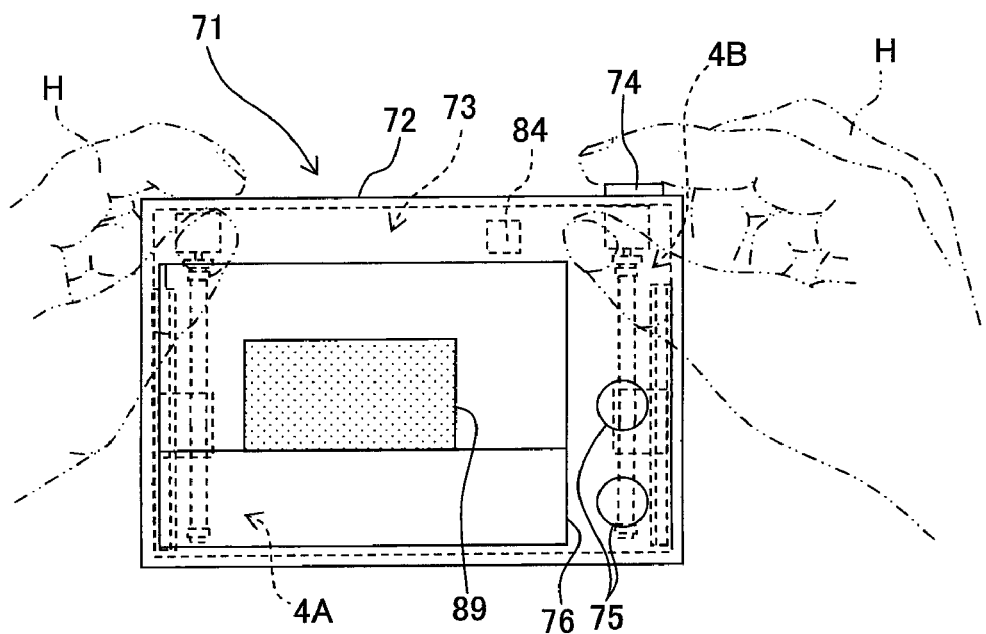

Next, the posture-correction control which the main control section 81 of the digital still camera 71 carries out will be described below with reference to FIGS. 10A and 10B. As shown in FIG. 10A, at the time of taking a picture, the user holds the casing 72 in a hand, and frames an object 89 in the display unit 76 as a finder. When such mode of taking a picture is assumed in this manner, the main control section 81 which is input from the posture sensor 84, compares a posture (a real posture) of the casing 72 and a target posture which is stored in the memory based on information of angle of inclination, and finds a direction of rotation which is necessary for making the rear posture of the casing 72 to be the target posture. Moreover, the main control section 81 drives the force-sense generating units 4A and 4B such that a pseudo force-sense which makes feel that a rotational force in the direction of rotation found has been acting, is imparted to the user. In an example shown in FIG. 10A, the two force-sense generating units 4A and 4B are to be driven to have the operation pattern shown in FIG. 6B for imparting virtually (pseudolly) the rotational force in the counterclockwise direction. In this case, the force-sense generating unit 4A at the left side is driven such that a pseudo force-sense which makes feel that the translational force $F_L$ in the downward direction has been acting, is imparted to the user, and the force-sense generating unit 4B at the right side is driven such that a pseudo force-sense which makes feel that the translational force $F_R$ in the upward direction has been acting, is imparted to the user.

Accordingly, the user virtually feels that the rotational force in the counterclockwise direction is generated in the casing 72. When the user rotates the casing 72 following this force-sense, as shown in FIG. 10B, the object 89 is framed to be horizontal in the finder, and it is possible to take a picture without the object 89 being inclined.

In this manner, according to the second example, in the digital still camera 71, an operation technique of as to how the casing 72 is to be rotated for taking a picture without an object being inclined by operating the two force-sense generating units 4A and 4B is presented to the user by appealing to the force-sense. It is possible to correct the posture only by rotating the casing 72 following the force-sense imparted to the user.

Next, as a third example, a mobile telephone is used as a mobile apparatus according to the present invention, and an example in which a control for guiding (hereinafter, called as a 'guidance control') from a location at present up to a destination determined in advance by appealing to the force-sense, is carried out by operating the force-sense generating units will be described below.

Figure 11:
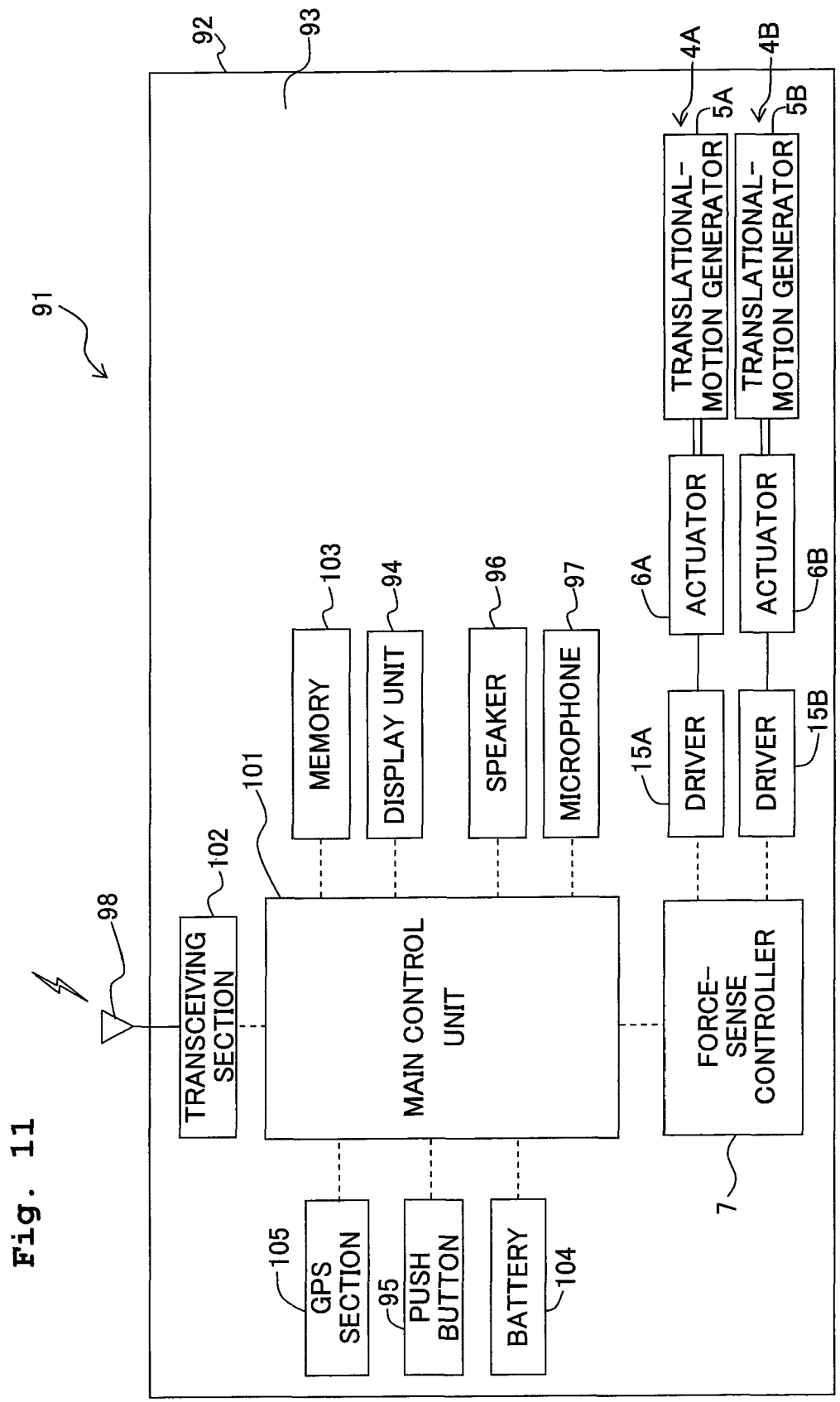
FIG. 11 is a block diagram showing schematically a structure of a mobile telephone shown as an example of the embodiment of the mobile apparatus according to the present invention.

FIG. 11 is a block diagram, showing schematically a structure of a mobile telephone shown as an example of the embodiment of the mobile apparatus according to the present invention. As shown in FIG. 11, a mobile telephone 91 includes a casing 92 having a substantially rectangular parallelepiped shape, and a main control section 101 which controls an overall operation of the mobile telephone 91 is provided in an internal space of the casing 92. The main control section 101 is connected to a display unit 94 which is provided at a front-surface upper portion of the casing 92, and is capable of displaying appropriate image information on the display unit 94. Moreover, the main control section 101 is connected to a push button 95 which is provided at a lower portion on a front surface of the casing 92, and when the push button 95 is pushed, an operations signal is input to the main control section 101.

Moreover, the main control section 101 is connected to a speaker 96 which is provided at an upper-end portion on the front surface of the casing 92, and a microphone 97 which is provided at a lower-end portion on the front surface of the casing 92, and is also connected to an antenna 98 via a transceiving section 102. At the time of a call (telephonic conversation), a transceiving section 102 demodulates a reception frequency signal from a base station which has been received via the antenna 98, and outputs to the main control section 101. The main control section 101 processes the signal input from the transceiving section 102, and outputs to the speaker 96. On the other hand, the main control section 101 processes an audio signal input from the microphone 97 and outputs to the transceiving section 102. The transceiving section 102 transmits to the antenna 98 upon converting to a transmission frequency signal, after modulating the signal from the main control section 101.

Moreover, the main control section 101 is connected to a GPS (global positioning system) section 105. The GPS section 105 receives radio waves for positioning from a GPS satellite which is not shown in the diagram, and computes information of a current location. Moreover, the GPS section 105 is accessible to a server at an outside, which is not shown in the diagram, and is capable of receiving map information of surrounding of the current location which is stored in the server. At least road information may be included in the map information, and information related to buildings in a surrounding area is not required to be included necessarily.

Furthermore, the main control section 101 is connected to the force-sense controller 7 of the force-sense generating units 4A and 4B formed similarly as shown in FIGS. 1 and 2. The force-sense controller 7 controls the actuators 6A and 6B such that the weights 9A and 9B of the translational motion mechanisms 5A and 5B reciprocate and that a force-sense of the translation force in a direction based on a command from the main control section 101 is imparted to the user.

Next, a guidance control which the main control section 101 of the mobile telephone 91 carries out will be described below with reference to FIG. 12. Prior to the guidance control, the user inputs position information of a destination in advance by pressing the push button 95. Information of destination which has been input is stored in a memory 103 which is connected to the main control section 101. Moreover, when the user imparts a command by pressing the push button 95, the main control section 101 starts the guidance control. When the guidance control is started, the map information and the information of the current location which is received by the GPS section 105 is input successively to the main control section 101.

Firstly, the main control section 101 generates image information based on the map information and the information of the current location received by the GPS section 105, and the information of the destination stored in the memory 103, and displays the image information on the display unit 94. Accordingly, a road R in a vicinity of the current location is displayed based on the map information. Also a current-location indicator (index) P1 is displayed by an asterisk etc., on the road R, and a destination indicator (index) P2 is displayed by a flag mark etc. on the road R.

Moreover, the main control section 101 computes a necessary route reaching the destination from the current location based on the road information. In a situation shown as an example in FIG. 12A, a route which includes a course of action of three items namely, 'go straight', 'turn left', and 'go straight' is to be computed. Next, the main control section 101 drives the two force-sense generating units based on the information of the current location and the route which is computed.

Figure 12A:
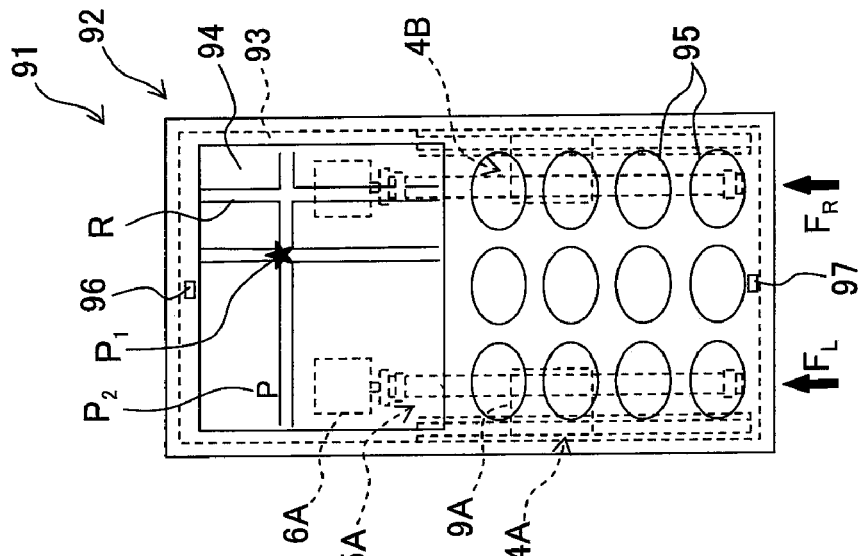
FIGS. 12A, 12B and 12C are conceptual diagrams of a guidance control which the mobile telephone shown in FIG. 11 carries out.

In FIG. 12A, for the GPS section 105 to reach the destination from the current location, it is necessary to 'go straight' on the road R. In this case, the main control section 101 drives the two force-sense generating units such that a pseudo force-sense which makes feel that a translational force in the upward direction has been acting, is imparted to the user. In other words, the main control section 101 controls the two force-sense generating units such that a movement pattern is as shown in FIG. 5A, and a pseudo force-sense which makes feel as if being pulled upward by the casing 92, is imparted to the user. When the user goes straight on the road following this force-sense, it is possible to move closer to the destination.

Figure 12B:
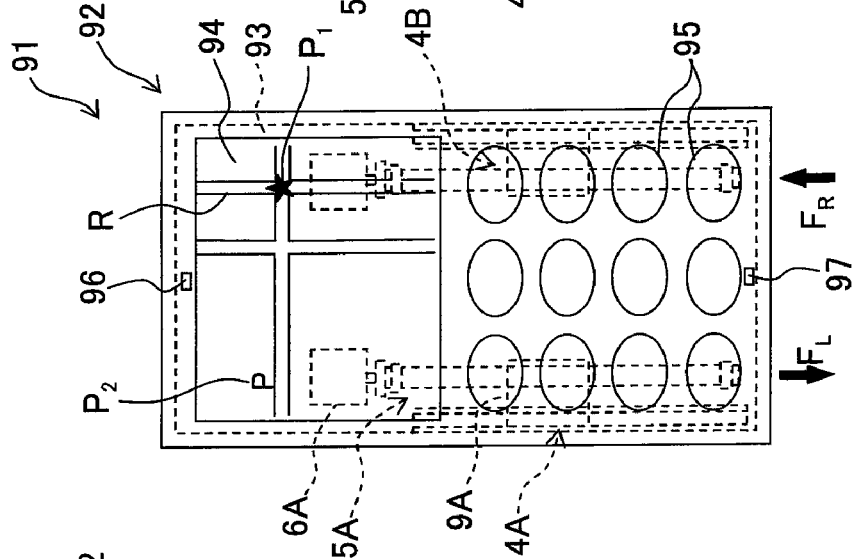

In FIG. 12B, it is necessary to take a left turn on the road R for reaching the destination from the current location. In this case, the main control section 101 drives the two force-sense generating units such that a pseudo force-sense which makes feel that a rotational force in the counterclockwise direction (leftward direction) has been acting, is imparted to the user. In other words, the main control section 101 controls the two force-sense generating units such that a movement pattern is as shown in FIG. 6B, and a pseudo force-sense which makes feel as if the casing 92 has been rotated leftward, is imparted to the user. When the user turns the road to left following the force-sense, it is possible to change the direction correctly toward the destination.

Figure 12C:
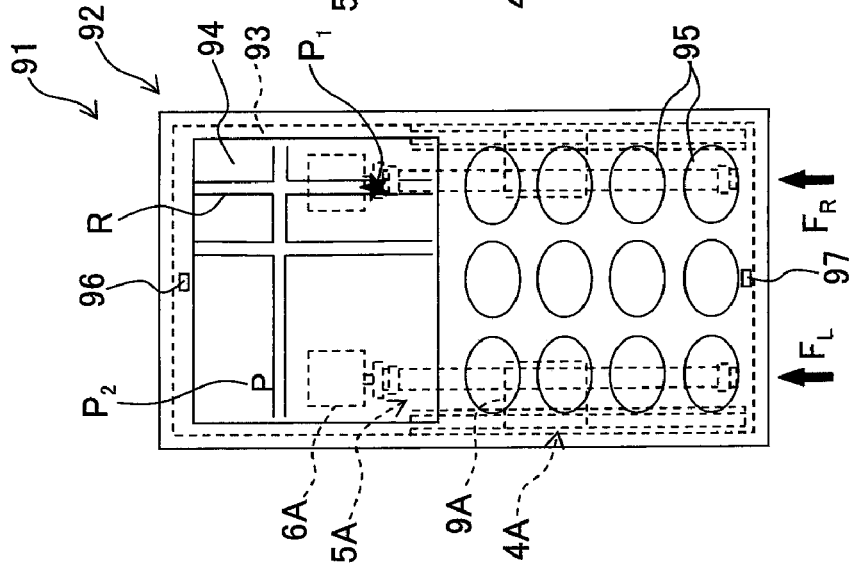

In FIG. 12, an example of a situation in which the user comes near an intersection is shown, and it is necessary to go straight on the road R for reaching the destination from the current location. In this case, the main control section 101 controls the two force-sense generating units similarly as shown in the example in FIG. 12A, and a pseudo force-sense which makes feel as if being pulled upward by the casing is imparted to the user. When the user goes straight on the road following the force-sense, it is possible to move correctly toward the destination.

In such manner, in this example, the user can reach the destination determined in advance from the current location only by moving in a direction in which the force imparted virtually from the casing of the mobile telephone acts.

As it has been described above, in the embodiment, it is possible to present the information not by appealing to eyes or ears, but by appealing to the force-sense. Therefore, the user can omit a troublesome task of interpreting information which is presented by appealing to the eyes and ears, and operating an equipment based on that interpretation, and can operate intuitively following the force-sense which is imparted to the user. Accordingly, an operability of the equipment is improved, and even when the user is not accustomed to handling electronic equipments, it is possible to operate easily.

In the embodiment described above, the two force-sense generating units have weights which are used exclusively for carrying out reciprocating movement for generating the force-sense. However, the present invention is not restricted to the weights, and, some other component which is assembled in the casing for some other application (for example, a battery) may also be used.

Figure 13A:
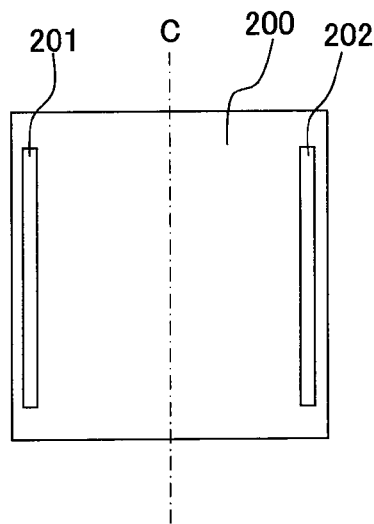
FIG. 13A is a diagram showing a state in which the two force-sense generating mechanisms are arranged in parallel, at symmetrical positions with respect to a center-of-gravity line of a casing.
Figure 13B:
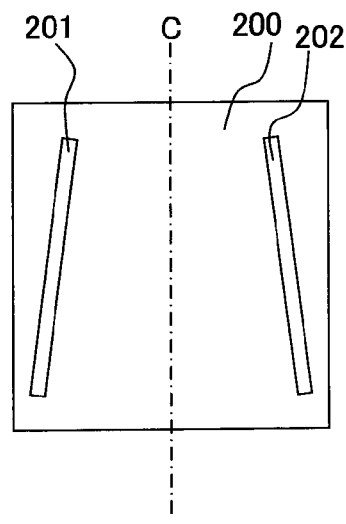
FIG. 13B is a diagram showing a state in which, the two force-sense generating mechanisms are arranged to be substantially parallel, at symmetrical positions with respect to the center-of-gravity line of the casing.
Figure 13C:
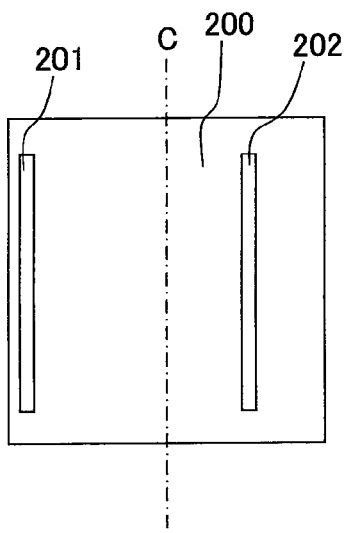
FIG. 13C is a diagram showing a state in which, the two force-sense generating mechanisms are arranged in parallel at asymmetrical positions with respect to the center-of-gravity line of the casing.
Figure 13D:
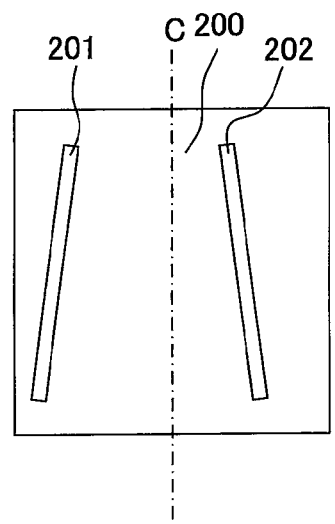
FIG. 13D is a diagram showing a state in which, the two force-sense generating mechanisms are arranged to be substantially parallel, at asymmetrical positions with respect to the center-of-gravity line of the casing.

In the embodiment described above, as shown in FIG. 13A, two force-sense generating units 201 and 202 are arranged to be mutually parallel at almost two ends of a casing 200. In other words, the two force-sense generating units 201 and 202 are arranged to be mutually parallel at symmetrical positions with respect to a centroidal line C which passes through a center of gravity of the casing 200. However, the present invention is not restricted to such structure. For instance, as shown in FIG. 13B, the two force-sense generating units 201 and 202 may be arranged to be substantially parallel, at symmetrical positions with respect to the centroidal line C of the casing 200. Moreover, as shown in FIG. 13C, the two force-sense generating units 201 and 202 may be arranged in parallel, at asymmetrical positions with respect to the centroidal line C of the casing 200. Or, as shown in FIG. 13D, the two force-sense generating units 201 and 202 may be arranged to be substantially parallel, at asymmetrical positions with respect to the centroidal line C of the casing 200. In such manner, in the present invention, the two force-sense generating units may be arranged on two sides of the center of gravity, sandwiching the center of gravity line of the casing. Moreover, the two force-sense generating units may not be necessarily arranged to be in parallel, and may be arranged to be substantially parallel. The shape of the casing is not restricted to a box-shape, and may be an arbitrary shape. Moreover, the two force-sense generating units are not required to be arranged necessarily in the internal space formed in the casing, and may be arranged on an outer side of the casing.

Figure 14A:
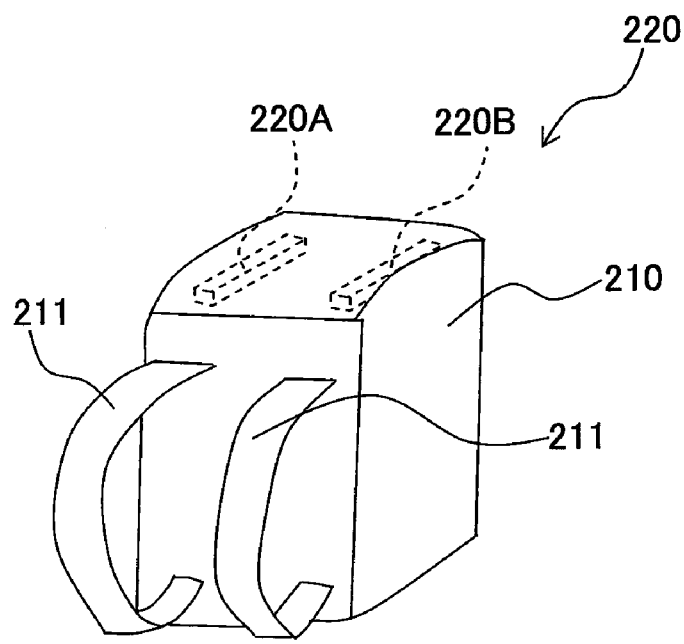
FIG. 14A shows a backpack navigation apparatus as an example of the mobile apparatus of the present invention.

In the embodiment described above, the description is made by citing an example of a case in which the user holds the casing by hands. However, the present invention is not restricted to this case. For instance, as shown in FIG. 14A, the present invention is also applicable to a backpack navigation apparatus 220 in which a shoulder strap 211 is provided to a casing 210 having a box-shape, and which user can carry on shoulder. Here, a force-sense generating unit similar to the above-mentioned force-sense generating unit is incorporated in the casing 210. The user, in a state of carrying the backpack navigation apparatus 220 on the shoulder, is capable of obtaining information related to direction, accurately through the force-sense. Therefore, the backpack navigation apparatus 220 according to the present invention is capable of guiding the user accurately from the current location to the destination which is determined in advance.

Figure 14B:
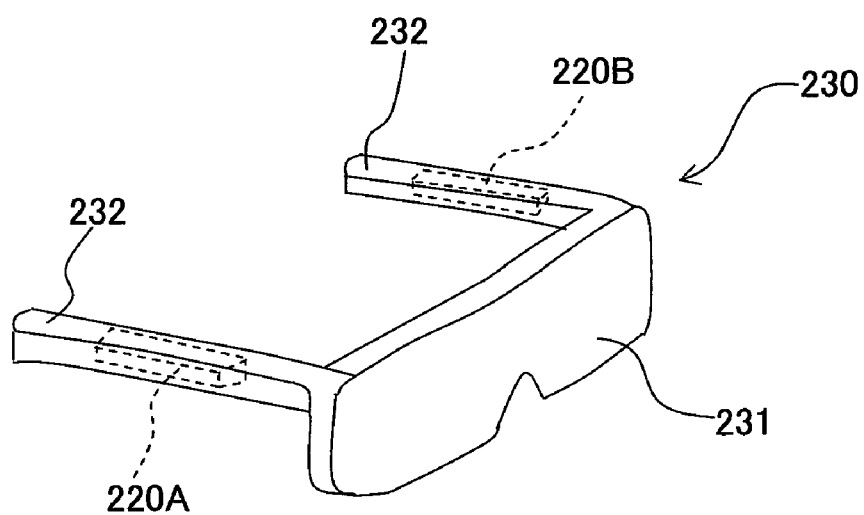
FIG. 14B shows a head-mounted display as another example of the mobile apparatus of the present invention.

Moreover, as shown in FIG. 14B, the present invention is applicable to a head-mounted display 230 of a spectacle type. The head-mounted display 230 includes a display section 231 which is arranged at a position corresponding to a lens portion of spectacles, and which covers eyes of the user when user has worn the head-mounted display 230, and two frame-rod sections 232 which are extended from the display section 231. When the user has worn the head-mounted display 230, the two frame-rod sections 232 extended to be pinching a side-head portion (temples) of the user, are placed on ears of the user. Here, the force-sense generating units similar to the force-sense generating units described above are incorporated in the two frame-rod portions 232. The user, in a state of the head-mounted display 230 worn, is capable of obtaining correctly, the information related to directions through the force-sense.

In such manner, the mobile apparatus of the present invention, without being restricted to an apparatus to be carried by the user by hands, is also applicable to an apparatus which is to be carried by the user by wearing on a body.

The mobile apparatus according to the present invention is capable of letting the user obtain correctly the information related to directions. Therefore, the user carrying the mobile apparatus of the present invention is capable of carrying out an operation intuitively based on the information imparted by the force-sense. The mobile apparatus of the present invention is applicable favorably to various mobile apparatuses such as a mobile ink-jet printer, a mobile telephone, a cordless handset of a land-line telephone, a digital still camera, a digital video camera, a mobile game console, a mobile music player, an operating device of a stationary game console, and an operating device of a television. Moreover, the present invention is also applicable to a portable navigation apparatus which includes a display unit capable of displaying the current position together with the map, by using a GPS mechanism and a gyro mechanism, and by finding the current location by using the GPS mechanism and the gyro mechanism.

What is claimed is:

1. A mobile apparatus which is carriable by a user, comprising:
   a casing;
   a first force-sense generating mechanism arranged in the casing, and configured to selectively impart to the user carrying the casing a force-sense of a first translation force directed toward one side in a first direction, and a force-sense of a second translational force directed toward the other side in the first direction; and
   a second force-sense generating mechanism arranged in the casing, at an opposite side of the first force-sense generating mechanism with respect to a straight line passing through a center of gravity of the mobile apparatus, and configured to selectively imparts a force-sense of a third translational force directed toward one side in a second direction which is substantially parallel to the first direction, and a force-sense of a fourth translational force directed toward the other side in the second direction.

2. The mobile apparatus according to claim 1, wherein the first force-sense generating mechanism and the second force-sense generating mechanism are arranged in an internal space of the casing defined in the casing, and the first direction is parallel to the second direction.

3. The mobile apparatus according to claim 2, wherein the first and second force-sense generating mechanisms include a first weight and a second weight, respectively, which are reciprocatable in the first direction and the second direction respectively, and the first and second force-sense generating mechanisms generate a positive acceleration directed toward one side in the first and second directions, and a negative acceleration directed toward the other side in the first and second directions, respectively, in the first and second weight to reciprocate the first and second weights, the positive acceleration and the negative acceleration being different in magnitude.

4. The mobile apparatus according to claim 3, wherein the first and second force-sense generating mechanisms include:
   a first ball screw and a second ball screw extended in the first direction and the second direction, respectively; a first motor and a second motor which rotate the first ball screw and the second ball screw, respectively; and a first guide rail and a second guide rail which are arranged to be parallel to the first ball screw and the second ball screw, respectively, and which slidably support the first and second weights, respectively; and
   screw holes which are engaged with the first ball screw and the second ball screw are formed in the first weight and the second weight, respectively, and the first and second ball screws are screwed through the screw holes, respectively.

5. The mobile apparatus according to claim 2, wherein the casing has a pair of inner surfaces which are mutually parallel, and which define the internal space; and the first and second force-sense generating mechanisms are arranged separately and in the vicinity of the pair of inner surfaces.

6. The mobile apparatus according to claim 2, wherein the first and second force-sense generating mechanisms are capable of operating mutually independently; and
   when the first and second force-sense generating mechanisms are operated and a direction of a force-sense imparted by the first force-sense generating mechanism is same as a direction of a force-sense imparted by the second force-sense generating mechanism, the mobile apparatus is configured to impart a force-sense of a translational force to the user, and
   when the first and second force-sense generating mechanisms are operated and the direction of the force-sense imparted by the first force-sense generating mechanism is opposite to the direction of the force-sense imparted by the second force-sense generating mechanism, the mobile apparatus is configured to impart a force-sense of a rotational force to the user.

7. The mobile apparatus according to claim 6, further comprising: a posture sensor which detects a posture of the casing; and
   a controller which controls operations of the first and second force-sense generating mechanisms, wherein the controller is configured to carry out a posture-correction control which includes: finding a direction of rotation which is necessary for changing the posture of the casing detected by the posture sensor to a target posture of the casing which is determined in advance; and driving the first and second force-sense generating mechanisms are configured to impart a force-sense of the rotational force in the direction of rotation the user.

8. The mobile apparatus according to claim 7, further comprising a liquid droplet jetting head which forms an image by jetting liquid droplets onto a recording medium, arranged in the casing, wherein the controller carries out the posture-correction control when the image is formed on a recording medium.

9. The mobile apparatus according to claim 7, further comprising a camera which is arranged in the casing, and which takes a photograph, wherein the controller carries out the posture-correction control when the photograph is taken.

10. The mobile apparatus according to claim 6, further comprising a position detecting mechanism configured to detect information of roads and information of a present location of the casing,
   wherein the controller is configured to carry out a guidance control including: driving the first and second force-sense generating mechanisms to impart to the user a force-sense of the translational force in a direction necessary for the casing to reach a destination determined in advance along the road based on the information of the location at present detected by the position detecting mechanism, the road information, and the destination; and driving the first and second force-sense generating mechanism, when a change of course is necessary, whereby a force-sense of the rotational force in a direction of the change of course is imparted to the user.

11. The mobile apparatus according to claim 1, further comprising a shoulder strap provided to the casing, and with which the casing is configured to be carried on a shoulder of the user.

12. The mobile apparatus according to claim 1, wherein the casing includes a display section which is arranged to cover an eye of the user and which displays an image, and two frame-rod sections configured to extend from the display section and arranged to sandwich temples of the user; and
   the first and second force-sense generating mechanism are arranged in the two frame-rod sections respectively.

13. The mobile apparatus according to claim 1, wherein the first weight and the second weight are same in weight.

14. The mobile apparatus according to claim 1, wherein the first force-sense generating mechanism and the second force-sense generating mechanism are arranged symmetrically with respect to a straight line passing through a center of gravity of the casing.

* * * * *